US012584048B2

(12) United States Patent
Lee et al.

(10) Patent No.: US 12,584,048 B2
(45) Date of Patent: Mar. 24, 2026

(54) AQUEOUS ADHESIVE COMPOSITION, MANUFACTURING METHOD OF THE SAME, ADHESIVE MEMBER MANUFACTURED USING THE SAME

(71) Applicant: LG Chem, Ltd., Seoul (KR)

(72) Inventors: Seungmo Lee, Daejeon (KR); Seung Hun Yang, Daejeon (KR); Kumhyoung Lee, Daejeon (KR); Sungjong Seo, Daejeon (KR); Jungeun Yeo, Daejeon (KR); Hye Soo Han, Daejeon (KR)

(73) Assignee: LG Chem, Ltd., Seoul (KR)

( * ) Notice: Subject to any disclaimer, the term of this patent is extended or adjusted under 35 U.S.C. 154(b) by 794 days.

(21) Appl. No.: 17/926,822

(22) PCT Filed: Apr. 13, 2021

(86) PCT No.: PCT/KR2021/004637
§ 371 (c)(1),
(2) Date: Nov. 21, 2022

(87) PCT Pub. No.: WO2021/246640
PCT Pub. Date: Dec. 9, 2021

(65) Prior Publication Data
US 2023/0105083 A1 Apr. 6, 2023

(30) Foreign Application Priority Data

Jun. 3, 2020 (KR) ........................ 10-2020-0067188
Apr. 6, 2021 (KR) ........................ 10-2021-0044781

(51) Int. Cl.
*C09J 11/06* (2006.01)
*C09J 133/10* (2006.01)

(52) U.S. Cl.
CPC ............. *C09J 133/10* (2013.01); *C09J 11/06* (2013.01); *C09J 2301/122* (2020.08); *C09J 2301/408* (2020.08)

(58) Field of Classification Search
CPC .... C09J 133/10; C09J 11/06; C09J 2301/122; C09J 2301/408; C09J 133/066; C09J 7/385; C08F 2810/20; C08F 8/14; C08F 220/1808
See application file for complete search history.

(56) References Cited

U.S. PATENT DOCUMENTS

| | | | |
|---|---|---|---|
| 6,797,280 B1 | 9/2004 | Kitazono et al. | |
| 6,927,267 B1 * | 8/2005 | Varela de la Rosa | ...................... |
| | | | C08F 220/12 |
| | | | 526/287 |
| 10,308,844 B2 * | 6/2019 | Higashi .................. | C09J 133/08 |
| 2012/0219795 A1 | 8/2012 | Mitsui et al. | |
| 2020/0199414 A1 | 6/2020 | Seo et al. | |

FOREIGN PATENT DOCUMENTS

| | | |
|---|---|---|
| CN | 102676094 A | 9/2012 |
| CN | 104093807 A | 10/2014 |
| CN | 104204128 A | 12/2014 |
| JP | 2018119075 A | 8/2018 |
| JP | 2019099608 A | 6/2019 |
| JP | 2019210440 A | 12/2019 |
| KR | 20010071049 A | 7/2001 |
| KR | 20150033596 A | 4/2015 |
| KR | 20170041368 A | 4/2017 |
| KR | 20170124219 A | 11/2017 |
| KR | 20190072421 A | 6/2019 |
| KR | 20190104805 A | 9/2019 |
| WO | 2013117428 A1 | 8/2013 |

OTHER PUBLICATIONS

Badia (Badia, A. et al, Biomacromolecules. 2020, vol. 21, pp. 4522-4531).*
Badia, A. et al., "Removable Biobased Waterborne Pressure-Sensitive Adhesives Containing Mixtures of Isosorbide Methacrylate Monomers," Biomacromolecules, May 22, 2020, pp. 4522-4531, vol. 21, American Chemical Society.
Gallagher, J.J. et al., "Acrylic Triblock Copolymers Incorporating Isosorbide for Pressure Sensitive Adhesives," ACS Sustainable Chemistry & Engineering, Apr. 23, 2016, pp. A-I, American Chemical Society.
Inayat, A. et al., "Greening the esterification between isosorbide and acetic acid," Sustainable Chemistry and Pharmacy, Nov. 6, 2017, pp. 41-49, vol. 7, Elsevier.
International Search Report for Application No. PCT/KR2021/004637 mailed Jul. 27, 2021, 2 pages.
Extended European Search Report including Written Opinion for Application No. 21818446.3 dated Sep. 27, 2023, pp. 1-7.

* cited by examiner

*Primary Examiner* — Kumar R Bhushan
(74) *Attorney, Agent, or Firm* — Lerner David LLP

(57) ABSTRACT

A method for manufacturing an aqueous adhesive composition and the aqueous adhesive composition are provided in the present application. The aqueous adhesive composition has excellent adhesive strength. The aqueous adhesive composition provides adhesion property having polar and non-polar adherends, and the method for manufacturing such aqueous adhesive composition is provided.

20 Claims, No Drawings

AQUEOUS ADHESIVE COMPOSITION, MANUFACTURING METHOD OF THE SAME, ADHESIVE MEMBER MANUFACTURED USING THE SAME

CROSS REFERENCES TO RELATED APPLICATIONS

This application is a national phase entry under 35 U.S.C. § 371 of International Application No. PCT/KR2021/004637 filed on Apr. 13, 2021, which claims priority from Korean Patent Application No. 10-2020-0067188 filed on Jun. 3, 2020 and Korean Patent Application No. 10-2021-0044781 filed on Apr. 6, 2021, all the disclosures of which are herein incorporated by reference in their entirety.

TECHNICAL FIELD

This invention relates to an aqueous adhesive composition, a method for preparing the same, and an adhesive member manufactured using the same.

BACKGROUND OF ART

Recently, the use of sticker-type surface finishing materials, such as interior/exterior building materials, interior decoration materials and advertising materials, and the like, to which pressure-sensitive adhesive (PSA) is applied, is significantly increasing.

Particularly, in the case of aqueous emulsion adhesive, the viscosity of adhesive is unrelated to the molecular weight of dispersed polymer, and thus, high molecular weight polymer compared to solvent-type polymer can be used, and the concentration range of solid content may be broadly obtained, ageing resistance is good, adhesion to low viscosity, low solid content area is good, and compatibility with other polymers is good.

However, since water is used as a solvent, drying speed is relatively slow, and since an emulsifier and a dispersant are included, adhesion, particularly adhesion to hydrophobic adherend or non-porous adherend is low compared to oil-based adhesive.

In order to increase adhesion of aqueous emulsion adhesive, a method of adding an internal cross-linking agent at the beginning of emulsion polymerization of a monomer mixture, a method of conducting emulsion polymerization of a monomer mixture comprising monomers having specific functional groups, and then, adding an external cross-linking agent capable of reacting with the specific functional groups, and the like are used.

However, according to the method of adding an internal cross-linking agent, it is difficult to control the degree of cross-linking after completion of emulsion polymerization. And, according to the method of adding an external cross-linking agent, the monomers having specific functional groups inevitably remain, thus decreasing adhesion property to the contrary.

Meanwhile, although vinyl-based monomers such as vinyl acetate, and the like are known to increase adhesion, the functional groups are decomposed to form acetic acid. However, acetic acid has higher vaporization temperature than water, and thus, is difficult to remove, and in case an aqueous adhesive composition comprising such by-products is dried and applied, bad smell by acid may be generated.

DETAILED DESCRIPTIONS

Technical Problem

It is an object of the invention to provide an aqueous adhesive composition having low acid by-products content and high adhesion property, a method for preparing the same, and an adhesive member manufactured using the aqueous adhesive composition.

Technical Solution

According to one embodiment of the invention, there is provided an aqueous adhesive composition comprising:
emulsion polymer of a monomer mixture comprising vinyl-based monomers, (meth)acrylic acid-based monomers, (meth)acrylic acid ester-based monomers comprising C1-14 alkyl groups, and (meth)acryl ester-based monomers comprising hydroxyl groups; and
a cyclic ether compound comprising two or more hydroxyl groups (—OH) in the molecule and having a molecular weight of 75 to 200 g/mol.

According to another embodiment of the invention, there is provided a method for preparing an aqueous adhesive composition comprising steps of:
mixing a monomer mixture comprising vinyl-based monomers, (meth)acrylic acid-based monomers, (meth)acrylic acid ester-based monomers comprising C1-14 alkyl groups, and (meth)acryl ester-based monomers comprising hydroxyl groups, an emulsifier and water to prepare a pre-emulsion;
conducting emulsion polymerization of the monomer mixture in the pre-emulsion, in the presence of a polymerization initiator, to obtain an emulsion resin composition comprising emulsion polymer of the monomer mixture and water; and
adding a cyclic ether compound comprising two or more hydroxyl groups (—OH) in the molecule and having a molecular weight of 75 to 200 g/mol to the emulsion resin composition, to obtain a mixture of the emulsion resin composition and the cyclic ether compound, which is an aqueous adhesive composition.

According to yet another embodiment of the invention, there is provided an adhesive member comprising:
a substrate; and an adhesive layer formed on at least one side of the substrate,
wherein the adhesive layer is formed by the aqueous adhesive composition according to the above-explained embodiment.

Advantageous Effect

Since the aqueous adhesive composition of one embodiment comprises the cyclic ether compound, acid by-products may decrease, and the cross-linking degree of the emulsion polymer may increase, and thus, adhesion property may be improved.

According to another embodiment, an aqueous adhesive composition having the above explained excellent properties can be obtained through a simple process of preparing an emulsion resin composition by the emulsion polymerization of a monomer mixture, followed by adding the cyclic ether compound and mixing.

The adhesive member of yet another embodiment comprises an adhesive layer formed by the aqueous adhesive composition having excellent properties as explained above, and it has low acid by-products content, and thus, there is no concern about generation of bad smell, and it has excellent cross-linking degree, thus exhibiting excellent adhesion property.

EMBODIMENTS FOR THE INVENTION

As used herein, terms "a first", "a second" and the like are used to explain various constructional elements, and they are used only to distinguish one constructional element from other constructional elements.

And, the terms used herein are only to explain specific embodiments, and are not intended to limit the invention. A singular expression includes a plural expression thereof, unless it is expressly stated or obvious from the context that such is not intended. As used herein, the terms "comprise" or "have", etc. are intended to designate the existence of practiced characteristic, number, step, constructional element or combinations thereof, and are not intended to preclude the possibility of existence or addition of one or more other characteristics, numbers, steps, constructional elements or combinations thereof.

Although various modifications can be made to the invention and this invention may have various forms, specific examples will be illustrated and explained in detail below. However, it should be understood that these are not intended to limit the invention to specific disclosure, and that the invention includes all the modifications, equivalents or replacements thereof without departing from the spirit and technical scope of the invention.

Hereinafter, an aqueous adhesive composition, a method for preparing the same, and an adhesive member manufactured using the same according to specific embodiments of the invention will be explained in detail.

Aqueous Adhesive Composition

According to one embodiment of the invention, there is provided an aqueous adhesive composition comprising:

emulsion polymer of a monomer mixture comprising vinyl-based monomers, (meth)acrylic acid-based monomers, (meth)acrylic acid ester-based monomers comprising C1-14 alkyl groups, and (meth)acryl ester-based monomers comprising hydroxyl groups; and a cyclic ether compound comprising two or more hydroxyl groups (—OH) in the molecule and having a molecular weight of 75 to 200 g/mol.

As used herein, the term "monomer mixture" means a state wherein the monomers are mixed together, and it may be prepared by simultaneously introducing the monomers or sequentially introducing the monomers, and the preparation method is not limited.

And, as used herein, the term "aqueous adhesive composition" comprises an "emulsion polymer" formed by the emulsion polymerization of a specific monomer mixture, a "cyclic ether compound" comprising specific substituents and having a molecular weight within a specific range, and water.

Hereinafter, unless otherwise defined, the "emulsion polymer" and "cyclic ether compound" respectively mean solid material except water.

Cyclic Ether Compound

Since the aqueous adhesive composition of one embodiment comprises a cyclic ether compound having a specific structure and a specific molecular weight, compared to the case of not comprising the same or comprising material of a different structure, 1) it may comprise a low content of acid by-products, and 2) have improved adhesion property.

1) First, the aqueous adhesive composition of one embodiment comprises an emulsion polymer of a monomer mixture comprising vinyl-based monomers.

However, if a monomer mixture comprising vinyl-based monomers is subjected to emulsion polymerization, the adhesive composition may exhibit high adhesion property, but may comprise a high amount of impurities.

Specifically, vinyl-based monomers themselves that failed to participate in emulsion polymerization and remain, a decomposition product thereof, i.e., acetic acid, or both may be inevitably included as impurities.

However, the cyclic ether compound of one embodiment may minimize acid impurities in the aqueous adhesive composition.

Wherein, the cyclic ether compound of one embodiment has two or more hydroxyl groups (—OH) in the molecule, and reacts with the remaining vinyl-based monomers, a decomposition product thereof, i.e., acetic acid, or both to form a chemical bond, thereby preventing the impurities from exhibiting acidic properties.

In the cyclic ether compound of one embodiment, hydroxyl groups (—OH) may be additionally produced by a ring opening reaction. The additional hydroxyl groups (OH) may also react with the remaining vinyl-based monomers, a decomposition product thereof, i.e., acetic acid, or both to form a chemical bond, thereby contributing to minimize impurities.

Thus, the aqueous acrylic adhesive composition may comprise acid impurities at a low concentration of 7000 ppm or less. And, by increasing the amount of the cyclic ether compound used, the concentration of acid impurities in the aqueous acrylic adhesive composition may be further lowered to 6000 ppm or less, 5000 ppm or less, 4000 ppm or less, 3900 ppm or less, or 3800 ppm or less.

As such, in case an aqueous adhesive composition having a low concentration of acid impurities is dried and used, bad smell by acid may not be generated or may be minimized.

2) Meanwhile, the cyclic ether compound of one embodiment may also react with surface functional groups of the emulsion polymer to form a chemical bond.

Wherein, the surface functional groups of the emulsion polymer that react with the cyclic ether compound may be carboxyl groups (—COOH) existing on the surfaces of repeat units derived from the (meth)acrylic acid-based monomers.

Specifically, two or more hydroxyl groups (—OH) in the cyclic ether compound molecule of one embodiment may bond with carboxylic groups (—COOH) existing on the surface of the emulsion polymer to form a crosslink structure, increase the surface cross-linking degree and cross-linking density of the emulsion polymer, and increase adhesive strength of an aqueous adhesive composition comprising the emulsion polymer.

In this regard, as the amount of the cyclic ether compound used increases, the surface cross-linking degree and cross-linking density of the emulsion polymer may be further increased, and adhesive strength of an aqueous adhesive composition comprising the emulsion polymer may be improved.

Wherein, the adhesive strength of the aqueous adhesive composition may be confirmed by a holding power test. Specifically, it may realize a holding power of 200 hours or more, when a holding power is tested according to FTM (FINAT TEST METHOD) No. 8, after preparing an adhesive member from the aqueous adhesive composition comprising the cyclic ether compound of one embodiment. The detailed explanations thereof will be described later.

However, the cyclic ether compound of one embodiment should have a molecular weight of 75 g/mol or more, so as to include a cyclic structure and two or more hydroxyl groups (—OH) in the molecule.

And, the cyclic ether compound of one embodiment should have a molecular weight of 200 g/mol or less, so as to maintain appropriate adhesive strength.

Specifically, the cyclic ether compound of one embodiment may have a molecular weight of 75 g/mol or more, 90 g/mol or more, 105 g/mol or more, 120 g/mol or more, or 135 g/mol or more, and 200 g/mol or less, 185 g/mol or less, or 170 g/mol or less.

More specifically, the cyclic ether compound of one embodiment is a cyclic ether compound comprising two or more hydroxyl groups (—OH) in the molecule and having a molecular weight of 75 to 200 g/mol, and it may be isosorbide (molecular weight: 146.14 g/mol), 1,4-sorbitan (molecular weight: 164.16 g/mol), or a mixture thereof. For example, as in Examples described below, isosorbide or 1,4-sorbitan may be used.

Unlike the cyclic ether compound of one embodiment, a cyclic compound that comprises two or more hydroxyl groups (—OH) in the molecule, but comprises a polygonal ring of octagonal or more or a long alkyl chains, and thus, has a molecular weight greater than 150 g/mol, may inhibit surface cross-linking of emulsion polymer, and lower the adhesive strength of an aqueous adhesive composition comprising the same, to the contrary.

For example, sorbitan mono fatty acid ester compounds, such as sorbitan monolaurate (molecular weight: 346.46 g/mol), sorbitan monopalmitate (molecular weight: 402.572 g/mol), sorbitan monostearate (molecular weight: 430.62 g/mol), and the like, have relatively small number of OH groups that can react with an adhesive composition, and have a low degree of dispersion in water, compared to an equal amount of isosorbide (molecular weight: 146.14 g/mol), 1,4-sorbitan (molecular weight: 164.16 g/mol), and the like.

As such, due to the low degree of dispersion in water, a part of the sorbitan mono fatty acid ester compound separately exists on the surface or inside of an adhesive composition, thus decreasing the adhesive strength of the adhesive composition.

And, due to the relatively small number of —OH groups that can react with an adhesive composition, the effect of inhibiting remaining acetic acid in the adhesive composition comprising the sorbitan mono fatty acid ester compound is low.

The cyclic ether compound of one embodiment may be included in the amount of 0.01 to 1 part by weight, based on 100 parts by weight of the emulsion polymer.

As mentioned above, the cyclic ether compound of one embodiment may further lower the concentration of acid impurities in the aqueous acrylic adhesive composition, by increasing the amount used.

Specifically, the cyclic ether compound of one embodiment may be used in an amount of 0.01 to 1.00 part by weight, 0.05 to 0.70, for example, 0.10 to 0.50 parts by weight, based on 100 parts by weight of the emulsion polymer, and the amount used may be determined considering the aimed effect.

A Monomer Mixture

The vinyl-based monomers may comprise one or more selected from the group consisting of vinyl ester-based monomers, comprising C1-5 alkyl groups; and aromatic vinyl-based monomers.

As the vinyl ester-based monomers, an ester-based monomer comprising a vinyl group at one end of the molecule, and comprising a C1-5 alkyl group at the other end, may be mentioned, and specifically, one or more selected from the group consisting of vinyl acetate, vinyl propanoate, vinyl butanoate, and vinyl pentanoate may be mentioned.

And, as the aromatic vinyl-based monomers, one or more selected from the group consisting of styrene, methyl styrene, butyl styrene, chlorostyrene, vinyl benzoate, methyl vinyl benzoate, vinyl naphthalene, chloromethyl styrene, hydroxymethyl styrene and divinyl benzene may be mentioned.

The vinyl-based monomers may be used alone or in combinations of two or more.

For example, the vinyl-based monomers may be included in the amount of about 0.5 to about 20 parts by weight, preferably, about 1 to about 20 parts by weight, or about 1 to about 15 parts by weight, based on 100 parts by weight of the total monomer mixture.

If the amount of the vinyl-based monomers used is too large, dispersion stability of latex may be deteriorated due to viscosity increase during a polymerization reaction, and adhesive strength may be lowered due to increase in glass transition temperature, and if it is too small, holding power may be deteriorated, but not limited thereto.

The (meth)acrylic acid-based monomers may be one or more selected from the group consisting of (meth)acrylic acid, maleic anhydride, fumaric acid, crotonic acid, itaconic acid, and they may be used alone or in combinations of two or more.

For example, the (meth)acrylic acid-based monomers may be included in the amount of about 0.1 to about 10 parts by weight, preferably about 0.1 to about 5 parts by weight, or about 0.1 to about 3 parts by weight, based on 100 parts by weight of the total monomer mixture.

If the amount of the (meth)acrylic acid-based monomers is too large, dispersion stability of latex may be deteriorated due to viscosity increase during a polymerization reaction, and if it is too small, conversion of monomers may decrease and adhesive strength may be lowered.

The (meth)acrylic acid ester monomers are not limited as long as they are known in the art as (meth)acrylic acid ester monomers having C1-C14 alkyl groups, i.e. alkyl groups having a carbon number of 1 to 14. For example, the (meth)acrylic acid ester monomers may be one or more selected from the group consisting of methyl (meth)acrylate, ethyl (meth)acrylate, propyl (meth)acrylate, isopropyl (meth)acrylate, butyl methacrylat, isobutyl (meth)acrylate, t-butyl (meth)acrylate, n-amyl (meth)acrylate, isoamyl (meth)acrylate, n-hexyl (meth)acrylate, n-heptyl (meth) acrylate, n-octyl (meth)acrylate, t-octyl (meth)acrylate, 2-ethylhexyl (meth)acrylate, decyl (meth)acrylate, isodecyl (meth)acrylate, tridecyl (meth)acrylate, dodecyl (meth)acrylate and cyclohexyl (meth)acrylate, and they may be used in combinations of two or more. Specifically, one or two selected from methyl (meth)acrylate, ethyl (meth)acrylate, butyl (meth)acrylate and 2-ethylhexyl (meth)acrylate may be used.

For example, the (meth)acrylic acid ester monomers may be included in the amount of about 55 to about 99 parts by weight, or about 58 to about 95 parts by weight, or about 62 to 90 parts by weight, based on 100 parts by weight of the monomer mixture, but not limited thereto.

In the (meth)acrylic acid ester monomers, methyl (meth) acrylate may be included in the amount of about 5 to 20 parts by weight, and the remaining (meth)acrylic acid ester monomers such as butyl (meth)acrylate and 2-ethylhexyl (meth)

acrylate may be included in the amount of about 30 to 50 parts by weight, based on the total amount of the monomer mixture. Particularly, if it consists only of monomers having long chain alkyl groups, such as butyl (meth)acrylate and 2-ethylhexyl (meth)acrylate, and the like, glass transition temperature(Tg) of the acrylic emulsion resin may significantly decrease, and soft polymer may be formed, and thus, adhesive strength may increase but holding power may rapidly decrease. Thus, an appropriate composition of monomers and comonomers may be constituted.

The (meth)acryl ester-based monomers comprising hydroxyl groups may be one or more selected from the group consisting of 2-hydroxyethyl (meth)acrylate, 2-hydroxypropyl (meth)acrylate, 2-hydroxybutyl (meth)acrylate, 4-hydroxyhexyl (meth)acrylate, 2-hydroxy ethyleneglycol (meth)acrylate, and 2-hydroxy propyleneglycol (meth)acrylate, and they may be used alone or in combinations of two or more.

For example, the (meth)acryl ester-based monomers comprising hydroxyl groups may be included in the amount of about 1 to about 10 parts by weight, preferably about 1 to about 5 parts by weight, or about 1 to about 3 parts by weight, based on 100 parts by weight of the monomer mixture.

If the amount of the (meth)acryl ester-based monomers comprising hydroxyl groups is too large, dispersion stability of latex may be deteriorated due to viscosity increase during a polymerization reaction, and if it is too small, holding power may be lowered, but not limited thereto.

Manufacturing Method of an Aqueous Adhesive Composition

According to another embodiment of the invention, there is provided a method for preparing an aqueous adhesive composition, comprising steps of:

mixing a monomer mixture comprising vinyl-based monomers, (meth)acrylic acid-based monomers, (meth)acrylic acid ester-based monomers comprising C1-14 alkyl groups, and (meth)acryl ester-based monomers comprising hydroxyl groups, an emulsifier and water to prepare a pre-emulsion;

conducting emulsion polymerization of the monomer mixture in the pre-emulsion, in the presence of a polymerization initiator, to obtain an emulsion resin composition comprising emulsion polymer of the monomer mixture and water; and adding a cyclic ether compound comprising two or more hydroxyl groups (—OH) in the molecule and having a molecular weight of 75 to 200 g/mol to the emulsion resin composition, to obtain a mixture of the emulsion resin composition and the cyclic ether compound, which is an aqueous adhesive composition.

This method corresponds to a method of obtaining an aqueous adhesive composition having excellent properties as explained above, through a simple process of preparing an emulsion resin composition by the emulsion polymerization of a monomer mixture, followed by adding the above explained cyclic ether compound and mixing.

The final product of the preparation method is as explained above, and the detailed explanations thereof are omitted. Hereinafter, the preparation method will be explained in detail according to steps.

First, a step of mixing a monomer mixture comprising vinyl-based monomers, (meth)acrylic acid-based monomers, (meth)acrylic acid ester-based monomers comprising C1-14 alkyl groups, and (meth)acryl ester-based monomers comprising hydroxyl groups, an emulsifier and water to prepare a pre-emulsion, is conducted.

Wherein, the "monomer mixture" means a state wherein the monomers are mixed together, and it may be prepared by simultaneously introducing the monomers or sequentially introducing the monomers, and the preparation method is not limited.

Meanwhile, the pre-emulsion may comprise additives other than the above explained components, within a range where the aimed effects of the invention are not hindered, without specific limitations.

For example, as the additives, an internal cross-linking agent, an external cross-linking agent, a buffer, a wetting agent, a neutralizing agent, a polymerization terminator, and a tackifier, and the like may be mentioned, and one or two or more of them may be additionally included.

The internal cross-linking agent may be one or more selected from the group consisting of methacrylamidoethyl ethylene urea, allyl methacrylate, polyethylene glycol diacrylate, polycarbodiimide, allyl-N-methylcarbamate, 1,6-hexanediol diacrylate, hexanediol ethoxylate diacrylate, hexanediol propoxylate diacrylate, pentaerythritol ethoxylate triacrylate, pentaerythritol propoxylate triacrylate, vinyltrimethoxy silane, and divinyl benzene. Wherein, the internal cross-linking agent may be used in the amount of about 0.2 parts by weight or less, or about 0 to 0.2 parts by weight, or about 0.15 parts by weight or less, or 0.01 to 0.15 parts by weight, based on the monomer mixture.

The external cross-linking agent may be designed such that a cross-linking reaction may additionally occur outside, using diacetone acrylamide (DAAM) and adipic acid dihydride (ADH). The external cross-linking agent may be added later at the end of a polymerization process, and serve as an intercross linker that connects between polymers. The external cross-linking agent may be used in the amount of about 1.2 parts by weight or less, or about 0 to 1.2 parts by weight, or about 0.7 parts by weight or less, or 0.01 to 0.7 parts by weight, based on 100 parts by weight of the monomer mixture.

As the buffer, sodium bicarbonate, sodium carbonate, sodium phosphate, sodium sulfate, sodium chloride, and the like may be mentioned, but not limited thereto. And, they may be used alone or in combinations of two or more. The buffer may function for controlling pH and giving polymerization stability. The buffer may be used in the amount of about 1.0 part by weight or less, or 0 to 1.0 part by weight, or 0.5 parts by weight or less, or 0.1 to 0.5 parts by weight, based on 100 parts by weight of the monomer mixture.

The wetting agent serves as an emulsifier that lowers surface tension for coatability, and the content may be within a range well known in the art. For example, as the wetting agent, dioctyl sodium sulfosuccinate (DOSS)-based compounds may be mentioned. The wetting agent may be used in the amount of about 1.0 part by weight or less, or 0 to 2.0 parts by weight, or 1.2 parts by weight or less, or 0.1 to 1.2 parts by weight, based on 100 parts by weight of the monomer mixture.

As the neutralizing agent, NaOH, NH₄OH, KOH may be mentioned. The neutralizing agent may be used in the amount of about 1.0 part by weight or less, or 0 to 1.0 part by weight, or 0.5 parts by weight or less or 0.1 to 0.5 parts by weight, based on the monomer mixture.

And, the polymerization terminator is introduced so as to inhibit side reactions between radicals remaining after preparation of latex, namely acrylic emulsion resin, and remaining monomers, and it is an additive that removes radicals to eliminate additional reactions. Such a polymerization terminator is also referred to as a radical inhibitor, or simply as an inhibitor. The polymerization terminator or material that rapidly reacts with radicals to destroy radicality and stabilize to stop a polymerization reaction is often added so as to conserve radically polymerizable monomers, because they are naturally polymerized, if left, and it is also referred to as a polymerization prevention agent, or polymerization inhibitor. However, even if an inhibitor is added, if some period (induction period) overly passes, it is consumed and polymerization is naturally initiated. Representative inhibitors include hydroquinone and p-tert-butyl catechol. Besides, benzoquinone, chloranil, m-dinitrobenzene, nitrobenzene, p-phenylenediamine sulfate and the like may be mentioned, and they easily react with radicals to stabilize them. And, stabilized radicals, such as diphenylpicrylhydrazyl, tri-P-nitrophenylmethyl, may be also used as an inhibitor. Preferably, as the polymerization terminator, $NaNO_2$ may be used. The polymerization terminator may be used in the amount of about 1.0 part by weight or less, or 0 to 1.0 parts by weight, or 0.5 parts by weight or less, or 0.1 to 0.5 parts by weight, based on the monomer mixture.

And, the tackifier is mixed with an aqueous adhesive latex with a purpose of improving adhesive strength, and natural rosin-based compounds or synthetic resin-based compounds having high glass transition temperature and low molecular weight may be used. The tackifier may be used in the amount of about 30 parts by weight or less, or 0 to 10 parts by weight, or 10 parts by weight or less, or 20 parts by weight or less, or 10 to 20 parts by weight, based on 100 parts by weight of the monomer mixture.

Meanwhile, the monomer mixture serves as a chain transfer agent (CTA) during a polymerization reaction of acrylic emulsion resin, and specifically, it is attached to the end of a molecule to transfer radicals elsewhere, and it may further comprise a molecular weight control agent. For example, 3-mercaptopropionic acid, and the like, capable of controlling to a shorter length than previously known n-DDM (1-dodecanethiol) may be used in a very small amount.

Meanwhile, the introduction sequence of components may be changed so as to smoothly conduct the polymerization process. For example, it may be preferable that, at the beginning of the polymerization process, additives such as a surfactant and a buffer, and the like are dissolved in water under stirring, and then, a monomer mixture comprising monomers, emulsifier, internal cross-linking agent, and the like is introduced under stirring.

The pre-emulsion may further comprise an aqueous solvent such as water, besides the above explained additives.

Wherein, the aqueous solvent may be used in the amount of about 10 to about 1,000 parts by weight, based on 100 parts by weight of the monomer mixture, in terms of stability of latex particles and viscosity control, and for example, it may be used such that the total solid content (TSC) may become about 10 to about 60 wt %, based on the total amount of the composition.

After preparing the pre-emulsion, a step of conducting emulsion polymerization of the monomer mixture in the pre-emulsion, in the presence of a polymerization initiator, to prepare an emulsion resin composition, is conducted.

Wherein, by conducting emulsion polymerization of the monomer mixture in the pre-emulsion in the presence of a polymerization initiator, emulsion polymer particles of the monomer mixture, namely, latex particles are prepared. And, each monomer may exist in the form of a repeat unit derived from each monomer, in the emulsion polymer particles.

The emulsifier is used to produce initial particles during a polymerization reaction of the monomer mixture, control the size of produced particles and stabilize the particles, and the like. As the emulsifier, one or more selected from non-ionic emulsifiers and anionic emulsifiers may be included.

The emulsifier is a material simultaneously having a hydrophilic group and a hydrophobic group, and it forms a micelle structure during an emulsion polymerization process, and enables polymerization of each monomer in the micelle structure.

The emulsifiers commonly used in emulsion polymerization may be classified into anionic emulsifier, cationic emulsifier, and non-ionic emulsifiers, and the like, and in terms of polymerization stability in emulsion polymerization, two or more kinds may be mixed and used.

Specifically, the anionic emulsifier may comprise one or more selected from the group consisting of a sodium alkyldiphenyl oxide disulfonate-based compound, a sodium polyoxyethylene alkyl ether sulfate-based compound, and a sodium dialkyl sulfosuccinate-based compound.

And, the non-ionic emulsifier may be one or more selected from the group consisting of a dialkyleneglycol alkyl ether-based compound, comprising a C2-5 alkylene group and a C5-15 alkyl group; a dialkyleneglycol alkyl ester-based compound, comprising a C2-5 alkylene group, and a C5-15 alkyl group; and a dialkyleneglycol alkyl amine-based compound, comprising a C2-5 alkylene group and a C5-15 alkyl group, they may be used alone or in combinations of two or more, and it may be more effective to use an anionic emulsifier and a non-ionic emulsifier in combination, but the kind of emulsifiers are not limited thereto.

And, the emulsifier may be used in the amount of about 0.01 to about 2.0 parts by weight, or about 0.1 to about 1.0 part by weight, based on 100 parts by weight of the monomer mixture.

If the amount of the emulsifier is too small, the size of latex particles prepared may increase, and polymerization stability may be deteriorated, and if the amount of emulsifier is too large, the size of latex particles prepared may too decrease, or adhesive property of the emulsion adhesive may be deteriorated, but not limited thereto.

As the polymerization initiator, an aqueous polymerization initiator, such as ammonium or alkyl metal persulfate, for example, ammonium persulfate, potassium persulfate, sodium persulfate, hydrogen peroxide, peroxide, hydroperoxide, and the like, may be used. Wherein, the content of the polymerization initiator may be about 1.0 part by weight or less or 0 to 1.0 parts by weight, or 0.6 parts by weight or less or 0.01 to 0.6 parts by weight, or 0.45 parts by weight or less or 0.1 to 0.45 parts by weight, or 0.4 parts by weight or less or 0.5 to 0.4 parts by weight, based on 100 parts by weight of the monomer mixture.

And, the polymerization initiator may be appropriately divided one or more times within the above range and used, during the polymerization step of the monomer mixture. However, in case the polymerization initiator is introduced at the beginning of polymerization, before a pre-emulsion in which an emulsifier is introduced is introduced into the monomer mixture, it is preferable to introduce in the amount of about 0.2 parts by weight or less or about 0 to 0.2 parts by weight, or about 0.1 parts by weight or less or about 0 to 0.1 parts by weight, or about 0.05 parts by weight or less or about 0 to 0.05 parts by weight. Preferably, the polymerization initiator may be introduced in division or continuously over about 80% to 120% of pre-emulsion introduction time, by a method of simultaneously introducing with the pre-emulsion.

In the preparation method of one embodiment, commonly known emulsion polymerization method may be used.

Thus, during the emulsion polymerization, polymerization temperature and polymerization time may be appropriately determined according to circumstances. For example, the emulsion polymerization may be conducted at a temperature of about 70 to 90° C. for about 3 to about 6 hours. And, considering the properties of adhesive, the polymerization temperature may be about 75 to about 85° C.

After the emulsion polymerization, a step of adding a cyclic ether compound comprising two or more hydroxyl groups (—OH) in the molecule and having a molecular weight of 75 to 200 g/mol to the emulsion resin composition, to obtain a mixture of the emulsion resin composition and the cyclic ether compound, which is an aqueous adhesive composition, is conducted.

In this step, only the structure and molecular weight of the cyclic ether compound, and the compositional ratio of the emulsion polymer and the cyclic ether compound in the emulsion resin composition are considered, and detailed explanations thereof are as explained above.

As the method of adding the cyclic ether compound to the emulsion resin composition, any addition methods commonly known in the art may be used, without specific limitations.

Adhesive Member

According to yet another embodiment of the invention, there is provided an adhesive member comprising a substrate; and an adhesive layer formed on at least one side of the substrate, wherein the adhesive layer is formed by the above-explained aqueous adhesive composition of the present disclosure.

And, the adhesive member of one embodiment has a low content of remaining acid, and may exhibit excellent results in terms of loop tack, peel strength and holding power of the adhesive layer.

For example, the aqueous adhesive composition is dried in a 140° C. oven for 1 hour to obtain a solid material. 1.0 g of the solid material is put in 4 mL of acetonitrile and dissolved, and then, the solution is centrifuged to obtain a supernatant as a sample solution, and the analysis results for the remaining acid (particularly, acetic acid) impurities dissolved in the sample solution are obtained using GC/FID (EQC-0248), and then, the analysis results are applied to already prepared calibration curve, thus calculating the residual amount.

The adhesive member of one embodiment may have a concentration of acid impurities as low as 7000 ppm or less, as calculated by the above method. As explained above, by increasing the cyclic ether compound used, the concentration of acid impurities in the adhesive member may be further lowered to 6000 ppm or less, 5000 ppm or less, 4000 ppm or less, 3900 ppm or less, or 3800 ppm or less.

According to FINAT test method No. 8 (FTM8) standard, a label specimen of the adhesive member is prepared, a release paper is removed, both sides of the sheet is folded to make a loop shape, both ends are fixed, and the loop is instantaneously attached to a stainless steel surface, and then, after about 5 seconds, under measurement environments of 23° C. and 50% humidity (RH), when separating to the opposite direction at a measurement speed of about 300 mm/min, a force corresponding to the maximum is measured, thereby calculating loop tack.

The adhesive member of one embodiment may have loop tack according to the FTM9 standard, of 15 N/in or more, 15.3 N/in or more, 15.5 N/in or more, 15.7 N/in or more, or 16. N/in or more. The upper limit is not limited, but it may be 20 N/in or less, 19.5 N/in or less, 19.0 N/in or less, 18.5 N/in or less.

And, according to FINAT test method No. 2 (FTM2) standard, a label specimen of the adhesive member is attached to a stainless steel surface and the size of the attachment side is controlled to 1 inch×1 inch or more, and then, a 2 kg roller is allowed to go back and forth twice at a speed of 300 m/min to compress it, and it is aged at room temperature for 20 minutes, and under 23° C. and 50% humidity conditions, a force is measured when 90° peeling the member attached to the stainless steel and aged at a speed of 300 mm/min for 5 seconds, thereby calculating peel strength.

The adhesive member of one embodiment may have 90 degree peel strength value measured against a SUS surface according to the FTM2 standard, of 7.6 N/in or more, 7.7 N/in or more, 7.8 N/in or more, 7.9 N/in or more, or 8.0 N/in or more. The upper limit is not limited, but it may be 10 N/in or less, 9.9 N/in or less, 9.8 N/in or less, 9.7 N/in or less, 9.6 N/in or less, or 9.5 N/in or less.

When preparing the aqueous adhesive composition, as the amount of the cyclic ether compound used increases, loop tack and peel strength of an adhesive member prepared using the aqueous adhesive composition tend to decrease, but the decreased loop tack and peel strength are still within commercially available ranges.

Considering such a tendency, the amount of the cyclic ether compound used may be controlled during preparation of the aqueous adhesive composition, according to the aimed properties of an adhesive member.

Particularly, according to FINAT test method No. 8 (FTM8) standard, the adhesive layer of the adhesive member is attached to a SUS surface and compressed, and then, aged, and while attaching the other side to a 2 degree inclined wall surface, a weight of 1 kg load is hung at the lower stage to give a fixed load, and then, under 23±2° C. and 55±5% RH conditions, a time when the adhesive layer falls from the attachment side of SUS, thereby calculating holding power.

The adhesive member of one embodiment may have holding power according to the FTM8 standard of 200 hours or more, 220 hours or more, 250 hours or more, 300 hours or more, or 320 hours or more. The upper limit is not limited, but it may be 500 hours or less, 490 hours or less, 480 hours or less, 470 hours or less, 460 hours or less, or 450 hours or less.

When preparing the aqueous adhesive composition, as the amount of the cyclic ether compound increases, holding power of an adhesive member manufactured using the aqueous adhesive composition tends to increase. Considering such a tendency, the amount of the cyclic ether compound used may be controlled during preparation of the aqueous adhesive composition, according to the aimed properties of an adhesive member.

Hereinafter, the actions and effects of the invention will be explained in detail through specific examples. However, these examples are presented only as the illustrations of the invention, and the scope of the invention is not limited thereby.

EXAMPLE

Example 1

A monomer mixture, an emulsifier and water were mixed to prepare a pre-emulsion, and then, the pre-emulsion was emulsion-polymerized to prepare an acrylic emulsion resin composition. Specific preparation process is as follows.

(STEP 1-1) First, into a 3 L glass reactor equipped with a thermometer, a stirrer, a dropping funnel, a nitrogen introduction tube and a reflux condenser, about 118 g of water was put and stirred, and the inside of the glass reactor was replaced with nitrogen. And then, under nitrogen atmosphere, the temperature was raised until the temperature inside the glass reactor reached to 85° C., and it is maintained for about 60 minutes.

(STEP 1-2) Into a beaker prepared separately from the glass reactor of STEP 1-1, 453 g of 2-ethylhexyl acrylate (2-EHA), 48.2 g of methyl methacrylate (MMA), 72.7 g of vinyl acetate (VAc), 12.1 g of styrene, 3.8 g of acrylic acid (AA), and 12.0 g of 2-hydroxyethyl acrylate (2-HEA) were introduced, and mixed for about 30 minutes to prepare a monomer mixture.

To the monomer mixture, an emulsifier aqueous solution consisting of 18.5 g of 26 wt % sodium polyoxyethylene lauryl ether sulfate (SOJ), 4.7 g of 63.5 wt % dioctyl sodium sulfosuccinate, 1.2 g of sodium hydroxide, 1.2 g of an internal cross-linking agent of 50 wt % methacrylamidoethyl ethylene urea, N-(2-2(oxoimidazolidin-1-yl)ethyl)methacrylamide (WAMII) and 104.8 g of water was added and mixed with a stirrer to prepare a cloud emulsion (pre-emulsion)

(STEP 2-1) In the glass reactor prepared in STEP 1-1, 2.6 g of 35 wt % ammonium persulfate aqueous solution was introduced, and stirred for 5 minutes to induce generation of radicals by thermal decomposition.

In the glass reactor where radicals were generated, while equally continuously introducing the pre-emulsion prepared in STEP 1-2 and 120 g of 3 wt % ammonium persulfate aqueous solution respectively for 5 hours (pre-emulsion) and 5.5 hours (3 wt % ammonium persulfate aqueous solution), and maintaining the temperature inside the glass reactor for 6.5 hours, an emulsion polymerization reaction was conducted for 6.5 hours.

(STEP 2-2) To the acrylic emulsion resin produced after the emulsion polymerization of STEP 2-1, 5 wt % sodium hydroxide for controlling pH, dioctyl sodium sulfosuccinate for increasing wettability, a silicon-based anti-foamer for giving antifoamability, and the like were added. The measurement value of the solid content of the acrylic emulsion resin composition cooled to room temperature is 57.1 wt %.

(STEP 3) 100 g of the acrylic emulsion resin composition obtained in STEP 2-2 was taken and mixed with 0.34 g of a 20 wt % isosorbide aqueous solution. Wherein, the mixed amount of isosorbide solid content except the solvent of the isosorbide aqueous solution (namely, water) is 0.068 g, which corresponds to 0.119 parts by weight, when converted based on 100 parts by weight of the emulsion polymer solid content.

The mixture of the acrylic emulsion resin composition and isosorbide aqueous solution was stirred for 30 minutes to obtain an aqueous adhesive composition of Example 1.

Example 2

An aqueous adhesive composition of Example 2 was prepared by the same method as Example 1, except that the amount of the 20 wt % isosorbide aqueous solution added to the acrylic emulsion resin composition in STEP 3 of Example 1 was changed to 0.67 g (0.134 parts by weight, when converted into the mixed amount of isosorbide solid content, based on 100 parts by weight of the emulsion polymer solid content).

Example 3

An aqueous adhesive composition of Example 3 was prepared by the same method as Example 1, except that the amount of the 20 wt % isosorbide aqueous solution added to the acrylic emulsion resin composition in STEP 3 of Example 1 was changed to 1.34 g (0.268 parts by weight, when converted into the mixed amount of isosorbide solid content, based on 100 parts by weight of the emulsion polymer solid content).

Example 4

An aqueous adhesive composition of Example 4 was prepared by the same method as Example 1, except that 0.27 g of 20 wt % 1,4-sorbitan was used (0.054 parts by weight, when converted into the mixed amount of 1,4-sorbitan solid content, based on 100 prats by weight of the emulsion polymer solid content), instead of the 20 wt % isosorbide aqueous solution added to the acrylic emulsion resin composition in STEP 3 of Example 1.

Example 5

An aqueous adhesive composition of Example 5 was prepared by the same method as Example 1, except that 0.81 g of 20 wt % 1,4-sorbitan was used (0.162 parts by weight, when converted into the mixed amount of 1,4-sorbitan solid content, based on 100 prats by weight of the emulsion polymer solid content), instead of the 20 wt % isosorbide aqueous solution added to the acrylic emulsion resin composition in STEP 3 of Example 1.

Example 6

An aqueous adhesive composition of Example 6 was prepared by the same method as Example 1, except that the amount of the 20 wt % isosorbide aqueous solution added to the acrylic emulsion resin composition in STEP 3 of Example 1 was changed to 0.085 g (0.017 parts by weight, when converted into the mixed amount of isosorbide solid content, based on 100 parts by weight of the emulsion polymer solid content).

Example 7

An aqueous adhesive composition of Example 7 was prepared by the same method as Example 1, except that 0.07 g of 20 wt % 1,4-sorbitan was used (0.014 parts by weight, when converted into the mixed amount of 1,4-sorbitan solid content, based on 100 prats by weight of the emulsion polymer solid content), instead of the 20 wt % isosorbide aqueous solution added to the acrylic emulsion resin composition in STEP 3 of Example 1.

Comparative Example 1

An acrylic emulsion resin composition was prepared by conducting STEP 1-1 to STEP 2-2 of Example 1, and it was designated as an aqueous adhesive composition of Comparative Example 1.

Comparative Example 2

An acrylic emulsion resin composition was prepared by conducting STEP 1-1 to STEP 2-2 of Example 1, and changing the amount of the cross-linking agent used to 0.12 g, and it was designated as an aqueous adhesive composition of Comparative Example 2.

Comparative Example 3

An aqueous adhesive composition of Comparative Example 3 was prepared by the same method as Example 1, except that 0.183 g of sorbitan monolaurate was used (0.320 parts by weight, when converted into the mixed amount of sorbitan monolaurate, based on 100 prats by weight of the emulsion polymer solid content), instead of the 20 wt % isosorbide aqueous solution added to the acrylic emulsion resin composition in STEP 3 of Example 1.

Comparative Example 4

An aqueous adhesive composition of Comparative Example 4 was prepared by the same method as Example 1, except that 0.172 g of sorbitan monopalmitate was used (0.301 parts by weight, when converted into the mixed amount of sorbitan monopalmitate, based on 100 prats by weight of the emulsion polymer solid content), instead of the Example 1, but instead, 3.67 g of a 20 wt % isosorbide aqueous solution (0.119 parts by weight, when converted into the mixed amount of isosorbide solid content, based on 100 parts by weight of the emulsion polymer solid content) was added to the emulsion of STEP 1-2. Except this, the same method as Example 1 was used to prepare the aqueous adhesive composition of Comparative Example 6.

For reference, the terms used in the following Table 1 are defined as follows.

1) Introduction amount of 20 wt % aqueous solution: introduction amount of the aqueous solution comprising added material at the concentration of 20 wt %, in Examples 1 to 7 and Comparative Example 6 (i.e., total introduction amount of added material+water)

2) introduction amount of added material only: introduction amount of added material without water, in Comparative Examples 3 to 5

3) converted value, based on 100 parts by weight of the emulsion polymer: value obtained by converting into the introduction amount of solid content of each added material of Examples 1 to 7 and Comparative Examples 3 to 6, based on 100 parts by weight of the emulsion polymer solid

TABLE 1

| | Amount of Internal cross-linking agent (WAMII) (g) | Added material | Introduction amount of added material | | |
|---|---|---|---|---|---|
| | | | Introduction amount of 20 wt % aqueous solution (g) | Introduction amount of added material only (g) | Converted value, based on 100 parts by weight of emulsion polymer (parts by weight) |
| Example 1 | 1.2 | isosorbide | 0.068 | — | 0.119 |
| Example 2 | 1.2 | isosorbide | 0.134 | — | 0.235 |
| Example 3 | 1.2 | isosorbide | 0.268 | — | 0.469 |
| Example 4 | 1.2 | 1,4-sorbitan | 0.054 | — | 0.095 |
| Example 5 | 1.2 | 1,4-sorbitan | 0.162 | — | 0.284 |
| Example 6 | 1.2 | isosorbide | 0.017 | — | 0.030 |
| Example 7 | 1.2 | 1,4-sorbitan | 0.014 | — | 0.025 |
| Comparative Example 1 | 1.2 | — | — | — | — |
| Comparative Example 2 | 1.5 | — | — | — | — |
| Comparative Example 3 | 1.2 | Sorbitan monolaurate | — | 0.183 | 0.320 |
| Comparative Example 4 | 1.2 | Sorbitan monopalmitate | — | 0.172 | 0.301 |
| Comparative Example 5 | 1.2 | Sorbitan monostearate | — | 0.158 | 0.277 |
| Comparative Example 6 | 1.2 | isosorbide | 3.67 (introduction of emulsion) | — | 0.119 |

20 wt % isosorbide aqueous solution added to the acrylic emulsion resin composition in STEP 3 of Example 1.

Comparative Example 5

An aqueous adhesive composition of Comparative Example 5 was prepared by the same method as Example 1, except that 0.158 g of sorbitan monostearate was used (0.227 parts by weight, when converted into the mixed amount of sorbitan monostearate, based on 100 prats by weight of the emulsion polymer solid content), instead of the 20 wt % isosorbide aqueous solution added to the acrylic emulsion resin composition in STEP 3 of Example 1.

Comparative Example 6

The 20 wt % isosorbide aqueous solution was not added to the acrylic emulsion resin composition of STEP 3 of

Experimental Example

Preparation of Adhesive Specimen Coated with Adhesive

An adhesive member was prepared using each aqueous adhesive composition of Examples and Comparative Examples.

Specifically, each aqueous adhesive composition of Examples and Comparative Examples was coated on a silicon coating release paper, and dried in an oven of about 120° C. for about 5 minutes such that the thickness of the adhesive layer became about 20 μm. It was laminated on an art paper to make a label, and cut to an appropriate size for each test to prepare a label specimen, and then, adhesive properties were tested as follows. The test results were shown in the following Table 2.

1) Loop Tack Test (N/Inch)

Loop tack was tested according to FINAT TEST METHOD NO. 9 (FTM 9).

Specifically, a label specimen with a size of 1 inch×20 cm was prepared, and then, a release paper was removed, both sides were folded to make a loop shape, and both ends were fixed to TA Texture Analyzer. The loop was instantaneously attached to the surface of stainless steel (SUS304), and after about 5 seconds, under measurement environment of 23° C. and 50% humidity (RH), a force corresponding to the maximum was measured when separating to the opposite direction at a measurement speed of about 300 mm/min.

For each Examples and Comparative Examples, 5 or more label specimens were prepared and measured by the above method, and the average value of the measurement values was reported in the following Table 2.

2) Peel Strength Test (N/Inch)

Peel strength was tested according to FINAT TEST METHOD NO. 2 (FTM 2).

Specifically, a label specimen with a size of 1 inch×20 cm was prepared, and attached to the surface of stainless steel (SUS304) such that the attachment side became 1 inch×1 inch or more, and then, a 2 kg roller is allowed to go back and forth twice at a speed of 300 m/min to compress it, and it is aged at room temperature for 20 minutes.

And then, under 23° C. and 50% humidity conditions, using TA Texture Analyzer, a force was measured when 90° peeling the member attached to the stainless steel and aged at a speed of 300 mm/min for 5 seconds.

For each Examples and Comparative Examples, 5 or more label specimens were prepared and measured by the above method, and the average value of the measurement values was reported in the following Table 2.

3) Holding Power Test (hr)

Holding Power (shear strength) was tested according to FTM (FINAT TEST METHOD) No. 8 standard.

Specifically, a label specimen with a size of 1 inch×20 cm was prepared, and attached to the surface of stainless steel (SUS304) such that the attachment side became 1 inch×1 inch or more, and then, a 2 kg roller is allowed to go back and forth twice at a speed of 300 m/min to compress it, and it is aged at room temperature for 20 minutes.

And then, the specimen compressed to the stainless steel and aged was attached to a wall surface inclined about 2 degree, and a weight of 1 kg was hung at the lower stage to give a fixed load, and then, under 23° C. and humidity of 50%, a time when the specimen fell from the attachment side of stainless steel was measured.

4) Residual Acetic Acid Amount (ppm)

Each aqueous adhesive composition of Examples and Comparative Examples was dried in an oven of 140° C. for 1 hour to obtain solid content. 1.0 g of the solid content was dissolved in 4 mL of acetonitrile, and then, it was centrifuged to obtain a supernatant as a sample solution. The analysis result for the residual acetic acid dissolved in the sample solution was obtained using GC/FID (EQC-0248), and applied for already prepared calibration curve to calculate the residual amount.

TABLE 2

| | Loop tack (N/in) | 90° peel strength (N/in) | Holding power (hr) | Residual acetic acid (ppm) |
|---|---|---|---|---|
| Example 1 | 18.2 | 8.6 | 321 | 2473 |
| Example 2 | 17.9 | 8.8 | 386 | 1928 |
| Example 3 | 16.4 | 8.1 | 427 | 1540 |
| Example 4 | 18.0 | 8.5 | 354 | 2247 |
| Example 5 | 16.5 | 8.0 | 434 | 1423 |
| Example 6 | 18.8 | 9.1 | 229 | 3729 |

TABLE 2-continued

| | Loop tack (N/in) | 90° peel strength (N/in) | Holding power (hr) | Residual acetic acid (ppm) |
|---|---|---|---|---|
| Example 7 | 18.5 | 8.6 | 245 | 3744 |
| Comparative Example 1 | 18.9 | 9.0 | 234 | 8760 |
| Comparative Example 2 | 16.2 | 7.4 | 356 | 8535 |
| Comparative Example 3 | 16.5 | 7.1 | 102 | 7943 |
| Comparative Example 4 | 16.7 | 6.4 | 94 | 7672 |
| Comparative Example 5 | 15.8 | 6.9 | 86 | 7450 |
| Comparative Example 6 | 16.1 | 7.5 | 147 | 3625 |

In the Table 2, it is confirmed that in case a cyclic ether compound comprising two or more hydroxyl groups (—OH) in the molecule and having a molecular weight of 140 to 200 g/mol was added to an acrylic emulsion resin composition (Examples 1 to 7), compared to the case wherein the cyclic ether compound was not added (Comparative Examples 1 and 2), the residual acetic acid amount in the final product (i.e., aqueous adhesive composition) remarkably decreased.

Furthermore, it is confirmed that in case the cyclic ether compound is added to the acrylic emulsion resin composition (Examples 1 to 7), as the amount of the cyclic ether compound used increases, the residual acetic acid amount in the final product tends to decrease and holding power tends to increase.

Meanwhile, as the amount of the cyclic ether compound used increases, loop tack and peel strength of the final product tend to partially decrease, but compared to the case wherein an internal cross-linking agent is added during emulsion polymerization (Comparative Example 2), the final product of Examples 1 to 7 exhibit still high levels of loop tack and peel strength.

Referring to such tendencies, it is possible to control the amount of the cyclic ether compound according to the aimed properties.

To the contrary, in case a sorbitan mono fatty acid ester compound having larger molecular weight than the cyclic ether compound is used (Comparative Examples 3 to 5: sorbitan monolaurate, sorbitan monopalmitate, sorbitan monostearate, etc.), adhesive strength decreases, and there is no significant change in the residual acetic acid content.

Specifically, sorbitan mono fatty acid ester compounds such as sorbitan monolaurate (molecular weight: 346.46 g/mol), sorbitan monopalmitate (molecular weight: 402.572 g/mol), sorbitan monostearate (molecular weight: 430.62 g/mol), and the like have relatively small number of —OH groups that can react with an adhesive composition, and low degree of dispersion in water, compared to the equal amount of isosorbide (molecular weight: 146.14 g/mol), 1,4-sorbitan (molecular weight: 164.16 g/mol), and the like.

As such, due to the low degree of dispersion in water, a part of the sorbitan mono fatty acid ester compound separately exists on the surface of inside of the adhesive composition, and decreases the adhesive strength of the adhesive composition.

And, since the number of —OH groups that can react with the adhesive composition is relatively small, the effect of inhibiting residual acetic acid in the adhesive composition comprising sorbitan mono fatty acid ester compound is low.

In case the cyclic ether compound is introduced in the emulsion of STEP 1-2 (mixed with pre-emulsion to progress polymerization) as in Comparative Example 6, compared to Examples wherein it is introduced in the polymerized acrylic emulsion resin composition, it is confirmed that adhesive strength, peel strength and holding power are deteriorated, and a degree of decrease in the residual acetic acid is low.

The cyclic ether compound does not have a double bond structure, and thus, does not directly participate in polymerization with a monomer mixture. However, many —OH groups included in the cyclic ether compound induce electrostatic resistance to acrylic emulsion resin having a polar surface by an emulsifier or polar monomers, and the viscosity of acrylic emulsion resin significantly increases from the polymerization process. As such, if the viscosity of acrylic emulsion resin increases from the polymerization process, mobility of material introduced during polymerization may decrease, resulting in deterioration of the properties of the final product.

In this case, even if additives are introduced in STEP 2-2, and the like, to lower the viscosity of the acrylic emulsion resin composition, since the properties of the acrylic emulsion resin prepared in STEP 1-2 have been already deteriorated, the properties of the final product may not be improved.

The invention claimed is:

1. An aqueous adhesive composition comprising:
emulsion polymer prepared by polymerizing a monomer mixture comprising vinyl-based monomers, (meth) acrylic acid-based monomers, (meth)acrylic acid ester-based monomers comprising C1-14 alkyl groups, and (meth)acryl ester-based monomers comprising hydroxyl groups; and
a cyclic ether compound comprising two or more hydroxyl groups (—OH) and having a molecular weight of 75 to 200 g/mol.

2. The aqueous adhesive composition according to claim 1, wherein a concentration of impurities in the aqueous adhesive composition is 7000 ppm or less and greater than 0 ppm and the impurities comprise vinyl-based monomers, decomposition products thereof, or a mixture thereof.

3. The aqueous adhesive composition according to claim 1, wherein
a part or all of the two or more hydroxyl groups (—OH) in the cyclic ether compound react with the impurities, surface functional groups of the emulsion polymer, or both thereof, to form a chemical bond.

4. The aqueous adhesive composition according to claim 1, wherein
the cyclic ether compound is isosorbide, 1,4-sorbitan, or a mixture thereof.

5. The aqueous adhesive composition according to claim 1, wherein the cyclic ether compound is included in an amount of 0.01 to 1.00 parts by weight, based on 100 parts by weight of the emulsion polymer.

6. The aqueous adhesive composition according to claim 1, wherein the (meth)acrylic acid ester-based monomers comprising the C1-14 alkyl groups comprise
one or more selected from the group consisting of methyl (meth)acrylate, ethyl (meth)acrylate, propyl (meth) acrylate, isopropyl (meth)acrylate, butyl methacrylat, isobutyl (meth)acrylate, t-butyl (meth)acrylate, n-amyl (meth)acrylate, isoamyl (meth)acrylate, n-hexyl (meth) acrylate, n-heptyl (meth)acrylate, n-octyl (meth)acrylate, t-octyl (meth)acrylate, 2-ethylhexyl (meth)acrylate, decyl (meth)acrylate, isodecyl (meth)acrylate, tridecyl (meth)acrylate, dodecyl (meth)acrylate and cyclohexyl (meth)acrylate.

7. The aqueous adhesive composition according to claim 1, wherein
the methacrylic acid ester monomers are included in an amount of 55 to 99.8 wt %, based on 100 wt % of a total monomer mixture.

8. The aqueous adhesive composition according to claim 1, wherein the vinyl-based monomers comprise:
one or more selected from the group consisting of vinyl ester-based monomers comprising C1-5 alkyl groups and aromatic vinyl-based monomers.

9. The aqueous adhesive composition according to claim 1, wherein the vinyl-based monomers are included in an amount of 5 to 20 wt %, based on 100 wt % of a total monomer mixture.

10. The aqueous adhesive composition according to claim 1, wherein the (meth)acrylic acid-based monomers comprise
one or more selected from the group consisting of (meth) acrylic acid, maleic anhydride, fumaric acid, crotonic acid, and itaconic acid.

11. The aqueous adhesive composition according to claim 1, wherein the (meth)acrylic acid-based monomers are included in an amount of 0.1 to 5 wt %, based on 100 wt % of a total monomer mixture.

12. The aqueous adhesive composition according to claim 1, wherein the (meth)acryl ester-based monomers comprising the hydroxyl groups comprise
one or more selected from the group consisting of 2-hydroxyethyl (meth)acrylate, 2-hydroxypropyl (meth) acrylate, 2-hydroxybutyl (meth)acrylate, 4-hydroxyhexyl (meth)acrylate, 2-hydroxy ethyleneglycol (meth) acrylate, and 2-hydroxy propyleneglycol (meth) acrylate.

13. The aqueous adhesive composition according to claim 1, wherein the (meth)acryl ester-based monomers comprising the hydroxyl groups are included in an amount of 0.1 to 5 wt %, based on 100 wt % of a total monomer mixture.

14. A method for manufacturing an aqueous adhesive composition, comprising:
mixing a monomer mixture comprising vinyl-based monomers, (meth)acrylic acid-based monomers, (meth)acrylic acid ester-based monomers comprising C1-14 alkyl groups, and (meth)acryl ester-based monomers comprising hydroxyl groups, an emulsifier and water to prepare a pre-emulsion;
conducting emulsion polymerization of the monomer mixture in the pre-emulsion, in the presence of a polymerization initiator, to obtain an emulsion resin composition comprising emulsion polymer of the monomer mixture and water; and
adding a cyclic ether compound comprising two or more hydroxyl groups (—OH) and having a molecular weight of 75 to 200 g/mol to the emulsion resin composition; and
forming the aqueous adhesive composition having a mixture of the emulsion resin composition and the cyclic ether compound.

15. The method according to claim 14, wherein the cyclic ether compound is added in an amount of 0.01 to 0.3 parts by weight, based on 100 parts by weight of the emulsion resin composition.

16. The method according to claim 14, wherein the polymerization initiator is an ammonium persulfate aqueous solution.

17. The method according to claim 14, wherein the pre-emulsion further comprises one or more selected from the group consisting of an internal cross-linking agent, a polymerization initiator, an external cross-linking agent, a buffer, a wetting agent, a neutralizing agent, a polymerization terminator, and a tackifier.

18. The method according to claim 14, wherein the emulsion polymerization is conducted under stirring at a temperature of 70 to 90° C. for 3 to 8 hours.

19. An adhesive member comprising:

a substrate; and an adhesive layer formed on at least one side of the substrate, wherein the adhesive layer is formed by the aqueous adhesive composition according to claim 1.

20. The adhesive member according to claim 19, wherein the adhesive member has an holding power of 200 hours or more, said holing power being obtained by measuring a time when the adhesive layer falls from an attachment side of SUS under conditions of 23±2° C. and 55±5% RH, after compressing the adhesive layer on a surface of SUS and aging, and while attaching the other side to a 2 degree inclined wall surface, hanging a weight of 1 kg load at a lower stage to give a fixed load, according to FINAT test method No. 8(FTM8) standard.

\*    \*    \*    \*    \*